Dec. 11, 1951     C. WALTE, SR     2,577,938
ROTARY BLADE POWER LAWN MOWER

Filed April 28, 1947     3 Sheets-Sheet 1

C. Walte, Sr.
INVENTOR

BY C.A. Snow & Co.
ATTORNEYS.

Dec. 11, 1951 C. WALTE, SR 2,577,938
ROTARY BLADE POWER LAWN MOWER
Filed April 28, 1947 3 Sheets-Sheet 2

C. Walte Sr.
INVENTOR
BY *CA Snow &Co.*
ATTORNEYS.

Dec. 11, 1951     C. WALTE, SR     2,577,938

ROTARY BLADE POWER LAWN MOWER

Filed April 28, 1947     3 Sheets-Sheet 3

C. Walte, Sr.
INVENTOR

BY *Cknowles*
ATTORNEYS.

Patented Dec. 11, 1951

2,577,938

UNITED STATES PATENT OFFICE 2,577,938

ROTARY BLADE POWER LAWN MOWER

Charles Walte, Sr., Louisville, Ky.

Application April 28, 1947, Serial No. 744,437

1 Claim. (Cl. 56—25.4)

This invention relates to lawn mowers of the power type and particularly that type of lawn mower wherein the power is supplied by an electric motor.

An important object of the invention is to provide a lawn mower wherein the motor is completely enclosed within the housing of the mower, the rotary cutting blade operating in a horizontal plane, directly under the motor in such a way that the speed of the blade will be somewhat reduced to eliminate the hum, commonly present in electric lawn mowers.

Still another object of the invention is to provide means for guarding the cutting edge of the blade, and at the same time provide means for combing or straightening the grass or vegetation prior to the contact by the rotary blade of the mower to insure the cutting of the grass or vegetation.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
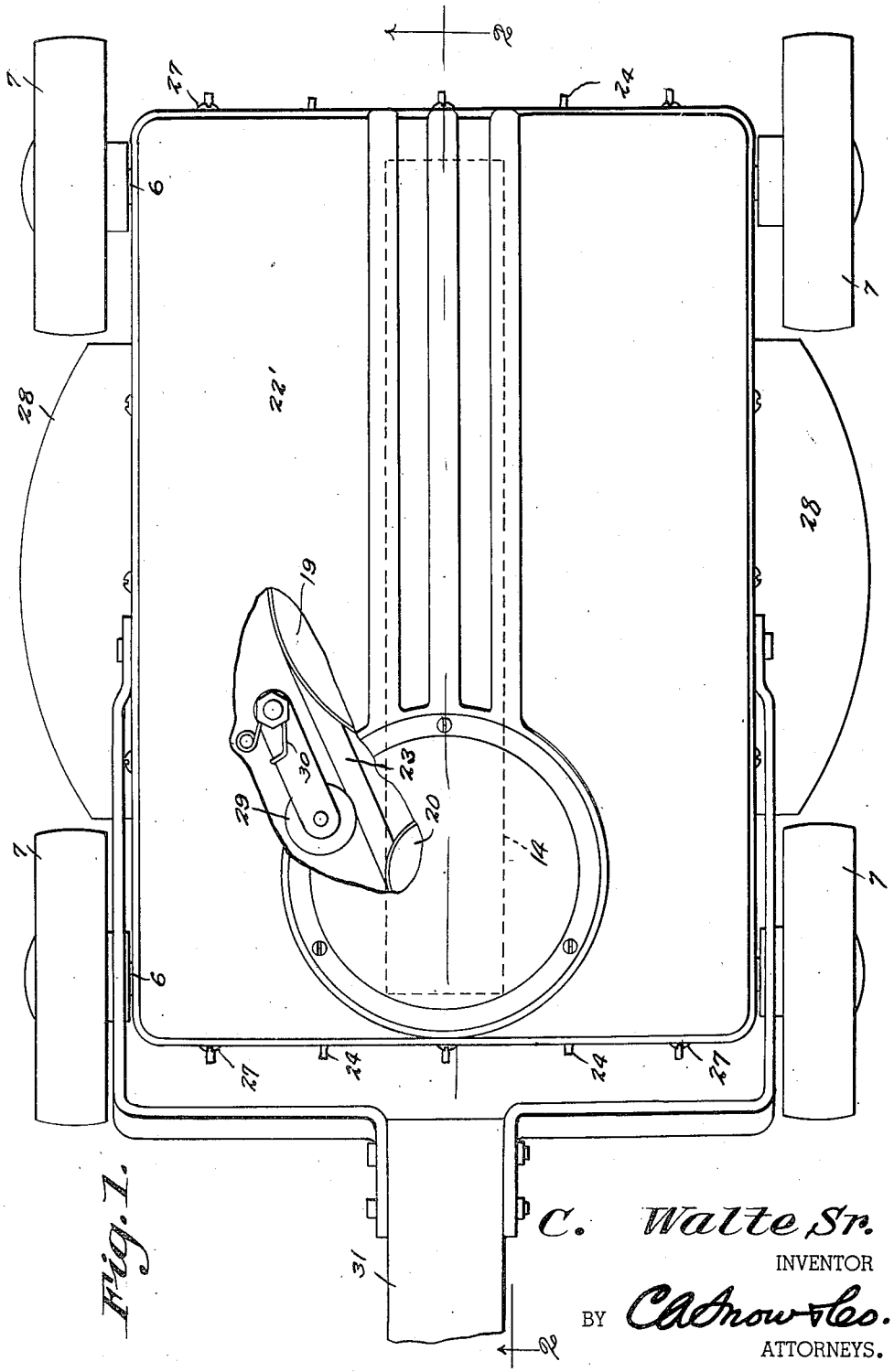
Figure 1 is a plan view of a lawn mower constructed in accordance with the invention, the power from the motor being transmitted to the rotary cutting blade through the medium of a belt and pulleys.

Referring to the drawings in detail, the mower comprises a wheel supported platform 5, to which the axles 6 are connected, the axles providing mounts for the wheels 7.

Positioned on the platform 5 and secured thereto by means of bolts 8, is a pulley housing 9, which is formed with a bearing in which the vertical shaft 10 operates, the vertical shaft 10 having its upper end extended into the bearing 11 mounted in an opening of the cover 12 of the pulley housing 9.

A shoulder 13 is formed on the shaft 10 against which the rotary cutting blade 14 engages, the blade 14 being secured to the disc 15 by means of the bolts 16. The reference character 17 indicates a nut which is secured on the threaded end of the shaft 10 and engages the hub 18 of the disc 15, securing the blade to the shaft.

Secured to the shaft 10 and mounted within the pulley housing 9, is the substantially large pulley 19, which is in direct line with the smaller pulley 20, secured to the lower end of the motor shaft 21 that forms a part of the motor 22, which is also mounted within the housing 22' of the mower. The pulleys 20 and 19 have V-shaped peripheries to accommodate the V-shaped belt 23, which is shown as operating thereover, the belt 23 transmitting movement of the pulley 20 to the pulley 19, which in turn operates the rotary blade shaft 10.

Because of the movements of the pulleys it will be seen that the speed of operation of the shaft 10 will be reduced to rotate the cutting blade 14 at the desired speed.

Arranged across the front and rear ends of the platform and depending therefrom, are spaced teeth 24 which act as combs to comb the grass and vegetation being cut to cause the same to stand up to insure the cutting of the grass or vegetation.

The spaced teeth are formed as a part of the bars 25 that are bolted to the upstanding flanges 26 arranged at the front and rear ends of the platform 5 by means of bolts 27. The lower ends of these teeth 24 extend appreciable distances below the plane in which the blade 14 operates so that the vegetation will be held in an upright position by the teeth as the machine passes thereover, prior to the cutting operation.

Extending laterally from the sides of the platform are curved guards 28, which include depending fingers extending below the plane in which the blade 14 operates, to insure against injury to persons moving in proximity to the rotary cutting blade 14 while the machine is in motion. It might be further stated that when the belt 23 is used to transmit movement of the motor to the cutting blade, an idle pulley 29 is provided, the pulley 29 being pivotally mounted and urged towards the belt 23 by means of the spring 30.

In order that the machine may be readily moved from place to place, or over the surface being mowed, a handle 31 is provided and extends from one end of the frame of the device.

In the form of the invention as shown by Sheet 2 of the drawing, the platform 5' provides a support for the motor 6', which is supported in the brackets 7' secured to the platform 5', the motor 6' resting in a horizontal position. The motor shaft 8' operates in a horizontal plane and is provided with the worm gear 9' on one end thereof, the worm gear 9' meshing with the gear 10' that moves in a horizontal plane and is secured to the shaft 11' that provides the mount for the rotary disc blade 12'.

Figure 2:
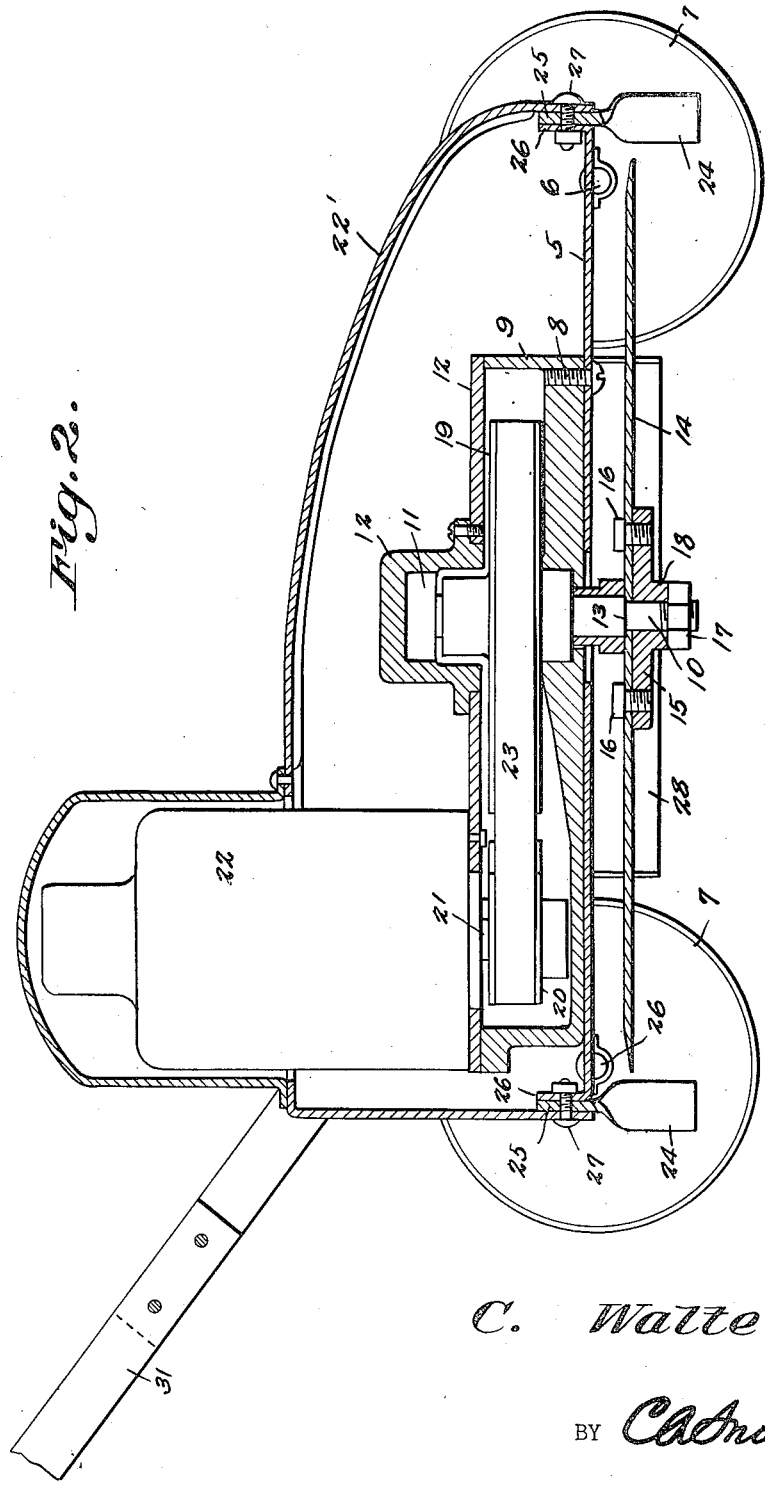
Figure 2 is a sectional view taken on line 2—2 of Figure 1.
Figure 3:
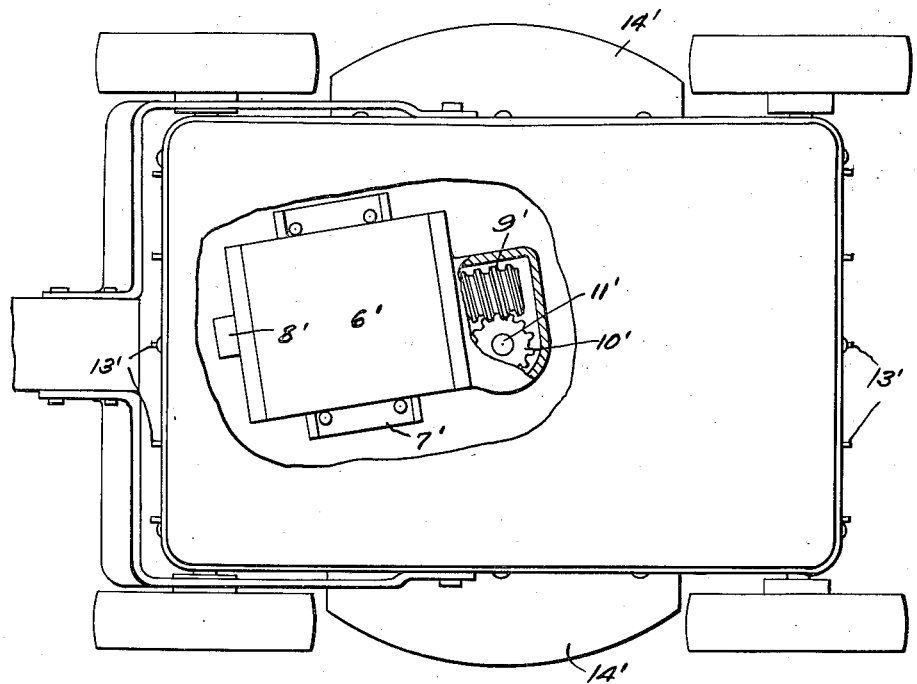
Figure 3 is a plan view of a modified form of the invention wherein gearing is employed in transmitting movements of the electric motor to the rotary blade.
Figure 4:
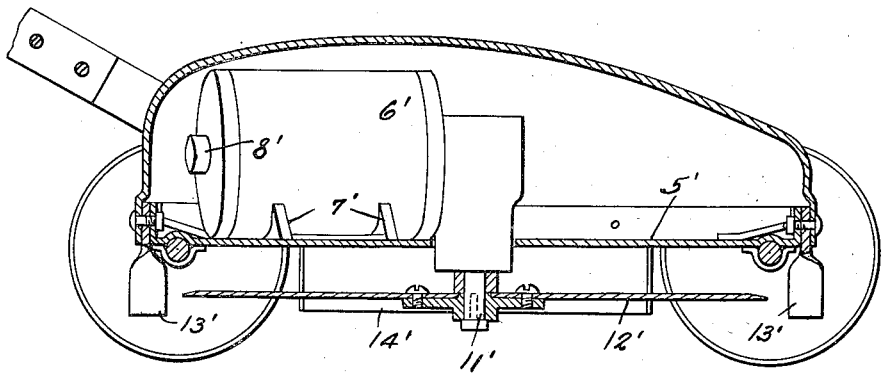
Figure 4 is a vertical longitudinal, sectional view through the base and housing midway between the wheels.

In this form of the invention, the guard fingers 13' are provided at the front and back of the machine and comb the vegetation to hold it upright while being cut by the rotary blade 12'. Lateral guards 14' are also formed on the machine and guard the rotary blade 12' while in motion. In this form of the invention gearing is used in lieu of the belt and pulley power mechanism as shown in Figures 1 and 2 of the drawings.

Having thus described the invention, what is claimed is:

A motor mower comprising a wheel-supported platform, a vertical blade shaft mounted on the platform, one end of said shaft extending below the bottom of the platform, semi-circular curved guard plates extending downwardly from the sides of the platform with their front and rear ends spaced substantial distances from the front and rear ends of said platform, rows of front and rear spaced wide teeth depending from the front and rear edges of said platform, and a disc-like cutting blade secured on the lower end of the blade shaft operating under the platform above the lower edges of the semi-circular curved guard blade, and teeth in close proximity to the rows of teeth, cutting material elevated by said teeth.

CHARLES WALTE, Sr.

REFERENCES CITED

The following references are of record in the file of this patent:

UNITED STATES PATENTS

| Number | Name | Date |
|---|---|---|
| 1,849,953 | Phalen | Mar. 15, 1932 |
| 1,880,154 | Rotondo et al. | Sept. 27, 1932 |
| 1,899,564 | Frey | Feb. 28, 1933 |
| 2,017,524 | Bolens | Oct. 15, 1935 |
| 2,154,564 | Eisenlohr | Apr. 18, 1939 |
| 2,403,236 | Phelps | July 2, 1946 |
| 2,518,093 | Sutter | Aug. 8, 1950 |